United States Patent
Gallagher (10) Patent No.: US 6,931,161 B2
(45) Date of Patent: Aug. 16, 2005

(54) METHOD FOR MAKING AN EXPOSURE ADJUSTMENT ON A RENDERED IMAGE

(75) Inventor: Andrew C. Gallagher, Brockport, NY (US)

(73) Assignee: Eastman Kodak Company, Rochester, NY (US)

(*) Notice: Subject to any disclaimer, the term of this patent is extended or adjusted under 35 U.S.C. 154(b) by 547 days.

(21) Appl. No.: 10/200,425

(22) Filed: Jul. 22, 2002

(65) Prior Publication Data

US 2004/0012799 A1 Jan. 22, 2004

(51) Int. Cl.[7] .................................................. G06K 9/40
(52) U.S. Cl. ........................ 382/274; 382/167; 358/519
(58) Field of Search ................................ 382/162, 167, 382/274; 358/519

(56) References Cited

U.S. PATENT DOCUMENTS

| 4,945,406 | A |   | 7/1990  | Cok ............................ 358/80 |
|-----------|---|---|---------|----------------------------------------|
| 5,414,538 | A |   | 5/1995  | Eschbach ..................... 358/522  |
| 5,926,562 | A | * | 7/1999  | Hyodo et al. ................ 382/167   |
| 6,285,784 | B1|   | 9/2001  | Spaulding et al. .......... 382/162     |
| 6,342,951 | B1|   | 1/2002  | Eschbach et al. ............ 358/1.9    |
| 6,563,945 | B2| * | 5/2003  | Holm .......................... 382/162  |
| 6,826,310 | B2| * | 11/2004 | Trifonov et al. ............ 382/274     |

* cited by examiner

Primary Examiner—Phuoc Tran
(74) Attorney, Agent, or Firm—David M. Woods (57) ABSTRACT

A method of adjusting the balance of a digital image including a plurality of pixel values inverts the pixel values and applies a gamma value ($\gamma$) individually to each inverted pixel value to raise each inverted pixel value to the power of the gamma value. The gamma value is related to an exposure adjustment amount (A) indicating a desired exposure adjustment of the original scene. Then the inverted pixel values are themselves inverted after application of the gamma value, thereby providing modified pixel values representative of a modified digital image that is adjusted for exposure.

19 Claims, 5 Drawing Sheets

METHOD FOR MAKING AN EXPOSURE ADJUSTMENT ON A RENDERED IMAGE

FIELD OF THE INVENTION

The invention relates generally to the field of digital image processing and, more particularly, to a method of modifying the exposure of a digital image.

BACKGROUND OF THE INVENTION

The dynamic range of images captured on one medium (such as negative film) may exceed the dynamic range of the medium that the image is rendered on (such as photographic paper). This results in a loss of image detail in the rendered image. The detail may be lost in the highlight portion of the image (such as when a backlit image is printed light enough to properly render the shadow detail, but rendered too light to show the highlight detail such as the clouds in the sky). Or the detail may be lost in the shadow portion of the image (such as when a "flash-in-the-face" image is rendered properly for the subject of the picture, but the background is rendered too dark to show the detail in the background).

In conventional photographic printing techniques, these problems are addressed by the process of exposure adjustment. The exposure of the image is determined such that the lightness of the image's subject is optimally reproduced on the rendered medium. In conventional digital output processing techniques, the digital image's exposure must also be adjusted for the optimal reproduction of the image's subject in the rendered image. Rendering, in a digital technique, describes the process of mapping the scene colors into the colors of the output medium. The rendered image is the image resulting from a rendering process. Rendering often results in the loss of image information due to many scene colors mapping to a single color in the rendered image.

If the digital image is encoded in a manner such that the code values are related linearly to the scene exposure (i.e., a linearly-encoded digital image), then an exposure adjustment can be digitally applied to the image by scaling the image by a constant. For example, scaling the digital values by a factor Q is similar to scaling the exposure time of the original image capture by a factor Q. If the digital image is encoded in a manner such that the code values are related to the logarithm of the scene exposure (i.e., a log-encoded digital image), then an exposure adjustment can be digitally applied to the image by adding a constant to the image.

The transformation performed by rendering a log-encoded image to the gamut of an output medium, thereby obtaining a rendered image, is a highly nonlinear transformation. The application of simple transforms such as linear functions to the rendered digital image, however, is not equivalent to modifying the exposure on the original scene.

In U.S. Pat. No. 6,285,784, Spaulding et al. describe a method of constructing an extended color gamut digital image from a limited color gamut digital image (such as a rendered image) and a residual image representing a difference between the extended color gamut digital image and the limited color gamut digital image, specifying a desired image modification (such as an exposure adjustment), and then producing a modified limited color gamut digital image. This method is computationally complex and requires a residual image.

In U.S. Pat. No. 5,414,538, Eschbach describes a method of modifying the exposure of an image by applying a gamma function to the image in order to map input signals representing overall input image intensity to overall output signals representing intensity as printed or displayed. This method of modifying image exposure, however, does not visually give an observer the impression that the exposure on the original scene was modified. In U.S. Pat. No. 6,342,951, Eschbach et al. describe a method of gamut mapping utilizing the process of inverting the gray value of each pixel, applying a gamma to the inverted gray values, and inverting each inverted gray value after the application of the gamma value. However, the method employed in by Eschbach et al. is not used to modify the exposure of a rendered image. Therefore there still exists a need to provide an improved method for modifying the exposure of a rendered digital image.

SUMMARY OF THE INVENTION

It is an object of the invention to adapt the process of inverting each pixel value, applying a gamma to the inverted pixel values, and inverting each inverted pixel value after the application of the gamma value to the modification of the exposure of a rendered image.

It is a further object of the invention to select the value of gamma such that a desired target exposure modification is realized in the rendered digital image.

The present invention is directed to overcoming one or more of the problems set forth above. Briefly summarized, according to one aspect of the present invention, a method of adjusting the balance of a digital image comprises the steps of: (a) receiving a digital image including a plurality of pixel values; (b) inverting the pixel values; (c) applying a gamma value ($\gamma$) individually to each inverted pixel value to raise each inverted pixel value to the power of the gamma value, wherein the gamma value is related to an exposure adjustment amount (A) indicating a desired exposure adjustment of the original scene; and (d) inverting the inverted pixel values after application of the gamma value, thereby providing modified pixel values representative of a modified digital image that is adjusted for exposure.

In the preferred embodiment, the digital image comprises a digital color image and the digital pixel values comprise red, green and blue component pixel values that are separately adjusted for exposure. Moreover, the digital image is a limited gamut digital color image, e.g., a rendered image. In a further specification of the invention, the gamma value $\gamma$ is related to the exposure adjustment A by $\gamma=b^A$, where b ranges between 1.75 and 2.25, and the optimal value of b is determined to be b=2.065.

In a further aspect of the invention, the functional relationship, from which an adjustment is derived for the balance of a limited gamut digital image, is obtained by: (a) receiving an extended color gamut digital image including a plurality of pixel values; (b) generating pixel values of a modified extended color gamut digital image by applying an exposure adjustment to the pixel values of the extended color gamut digital image; (c) producing pixel values of a limited gamut digital image by rendering the pixel values of the extended color gamut digital image; (d) producing pixel values of a modified limited gamut digital image by rendering the pixel values of the modified extended color gamut digital image; and (e) determining a functional relationship between the pixel values of the modified limited gamut digital image and the limited gamut digital image, whereby an adjustment is derived from the functional relationship for adjusting the balance of the limited gamut digital image.

Given the above-identified functional relationship, when pixel values are received of a different limited gamut digital signal, the adjustment derived from the functional relationship is used to modify the pixel values of the different limited gamut digital image in order to produce a modified limited gamut digital image that is adjusted for balance.

The present invention has the advantage of effectively modifying the exposure of an original scene from which a digital image is obtained by simply applying an exposure adjustment directly to a rendered digital image, that is, to a limited gamut digital image such as an image rendered for sRGB space.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

In the following description, an embodiment of the present invention will be described as a method that would ordinarily be implemented as a software, or computer, program. Those skilled in the art will readily recognize that the equivalent of such software may also be constructed in hardware. Furthermore, because image enhancement algorithms and methods are well known, the present description will be directed in particular to elements forming part of, or cooperating more directly with, the method in accordance with the present invention. Other elements, and hardware and/or software for producing and otherwise processing the image signals, not specifically shown or described herein, may be selected from such materials, components and elements known in the art. Given the method as shown and described according to the invention in the following materials, software not specifically shown, described or suggested herein that is useful for implementation of the invention is conventional and within the ordinary skill in such arts.

Still further, as used herein, the computer program may be stored in a computer readable storage medium, which may comprise, for example; magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

Figure 1:
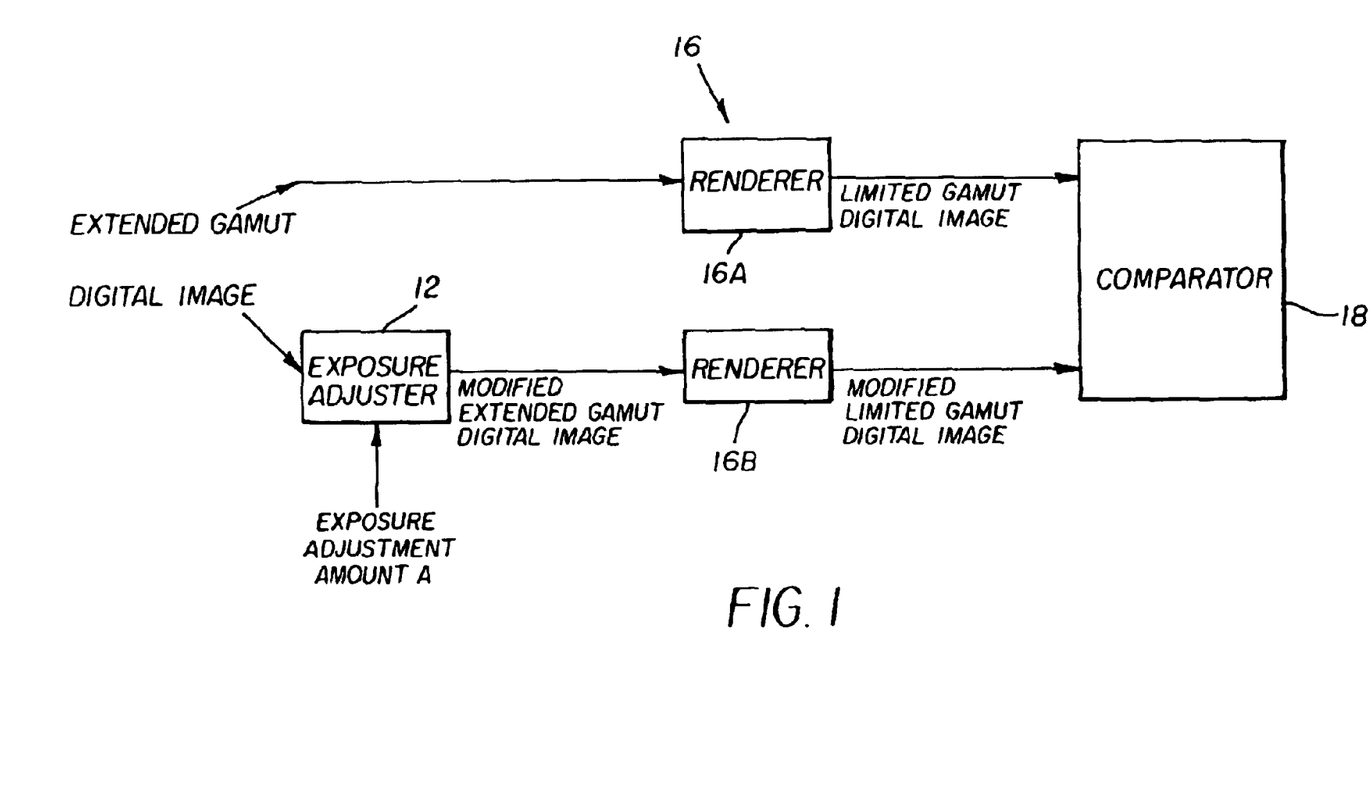
FIG. 1 is a block diagram of a technique for determining the functional relationship between the magnitude of an exposure adjustment applied to an extended gamut digital image and its effect on the values of a modified limited gamut digital image.

FIG. 1 illustrates an imaging system useful for describing the invention. An extended color gamut digital image is input to an exposure adjuster 12 along with an exposure adjustment amount A. An extended color gamut digital image has color values that are outside the limited color gamut of a storage color space, such as would be associated with a typical output process or output medium. Preferably, images are composed of a number of pixels, each having a number of color component values. Preferably, the color component values represent the red, green, and blue components for each pixel. Those skilled in the art will recognize that the present invention can be successfully applied to images made up of any number of pixels and any number of color components, as well as images made up of pixels having only luminance, or monochrome, values, i.e., a monochrome image.

The exposure adjuster 12 modifies the digital image in such a manner as to produce the effect that the exposure was modified at the time the image was captured. If the digital image is a linearly-encoded digital image, then the exposure adjuster 12 modifies the image's exposure by scaling each pixel and each color component by a constant Q, related to the exposure adjustment amount A. For example, if the exposure adjuster 12 scales the linearly-encoded digital image by 2, then the effective exposure has been doubled. Those skilled in the art of photography refer to a factor of 2 as a stop.

Preferably, the extended color gamut digital image is a log-encoded digital image. The exposure adjuster 12 modifies the exposure of the digital image by adding a constant Q, related to the exposure adjustment amount A, to each pixel and each color component of the digital image. For example, if the log-encoded digital image is encoded such that there are 300 code values per stop, then the exposure adjuster 12 adds a constant value of 300 to the log-encoded digital image for each stop of effective exposure adjustment A made to the scene (e.g., Q=300A). Generally, exposure adjustments are indicated in the aforementioned stops (a factor of 2) or in buttons (0.4 stops), which are well-known factors that relate to exposure control increments applied to optical printers. Converting stops or buttons to code values is well known in the art. Preferably, the exposure adjustment amount A input to the exposure adjuster 12 is in units of stops of exposure adjustment and generally ranges between −6 and +6 stops of exposure adjustment. The output of the exposure adjuster 12 is a modified extended color gamut digital image.

A renderer 16 is used to adjust the color values of the extended color gamut digital image to fit within the limited color gamut of the storage space, forming a limited color gamut digital image. The renderer 16 discards information when color values are outside the limited color gamut. The color values that are outside the limited color gamut are mapped to color values within the limited color gamut.

In some cases, the color values for the out-of-gamut colors are simply "clipped", i.e., they are mapped to color values on the surface of the limited color gamut. In other cases, more sophisticated, but well-known, gamut mapping methods can be used to compress the extended color gamut into the limited color gamut without introducing a hard clipping function. For example, the chroma of the input color values can be scaled so that the most saturated colors in the extended color gamut are mapped to the most saturated colors in the limited color gamut. Alternatively, a gamut mapping method can be used that is designed to preserve color appearance as closely as possible. Regardless of what gamut mapping technique is used, there will necessarily be a loss of information and a distortion of the color characteristics of the image.

In many cases, the extended color gamut will contain color values that have higher chroma values than can be represented in the limited color gamut. In some cases, the extended color gamut can also have a larger luminance dynamic range than can be represented in the limited color gamut. In the case where it is necessary to reduce the luminance dynamic range of the image, one part in the implementation of the renderer 16 is typically the application of a tone scale function. The tone scale function maps the input image intensities to output image intensities and might be applied to a luminance channel of the image, or alternatively to each color channel of an RGB color representation. The image being processed could actually be a monochrome image. In this case, the tone scale function can be applied directly to the monochrome image luminance values.

Preferably, the extended color gamut digital image is a representation of the colors in an original scene, and the renderer 16 typically determines the reproduced color values that will produce desired aim colors on a target output device. For example, optimal color reproduction aims can be applied to determine desired video RGB aim colors for the original scene colors. The preferable limited color gamut is the well defined sRGB standard for a video output medium.

A first renderer 16A inputs the extended color gamut digital image and outputs a limited color gamut digital image. In addition, a second renderer 16B inputs the modified extended color gamut digital image and outputs a modified limited color gamut digital image. In both cases, the color values of the extended, or modified extended, color gamut digital image are adjusted to fit within the limited color gamut of the storage space, forming a limited, or modified limited, color gamut digital image.

The comparator 18 compares the limited color gamut digital image with the modified limited color gamut digital image in order to determine the functional relationship between the magnitude of the exposure adjustment A, and the effect on the code values of the modified limited color gamut digital image. Commonly available statistical or mathematical programs, such as MathWork's Matlab program, can be used by the comparator 18, or by a conventional processor (not shown) connected to the comparator 18, to determine good functional fits to data.

Figure 2:
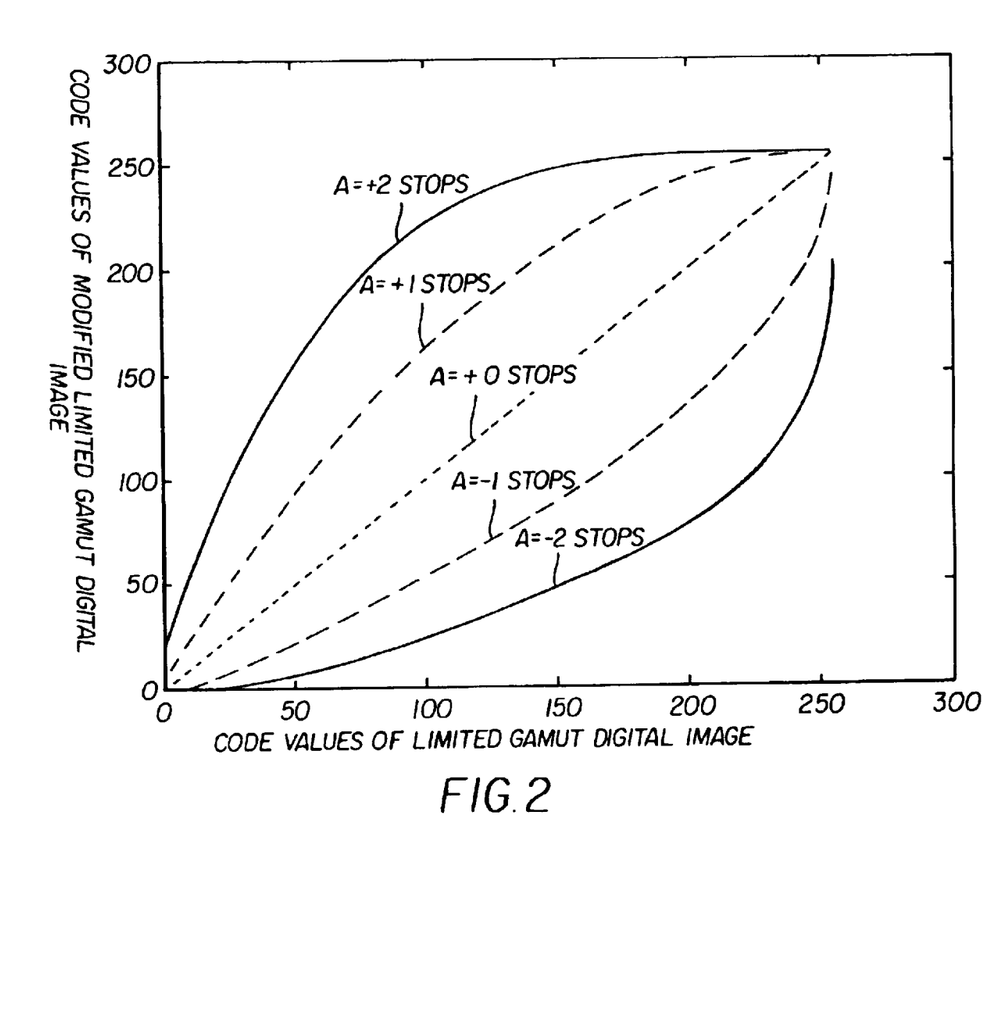
FIG. 2 is a plot illustrating the effects of several different exposure adjustment amounts on the code values of a limited gamut digital image.
Figure 3:
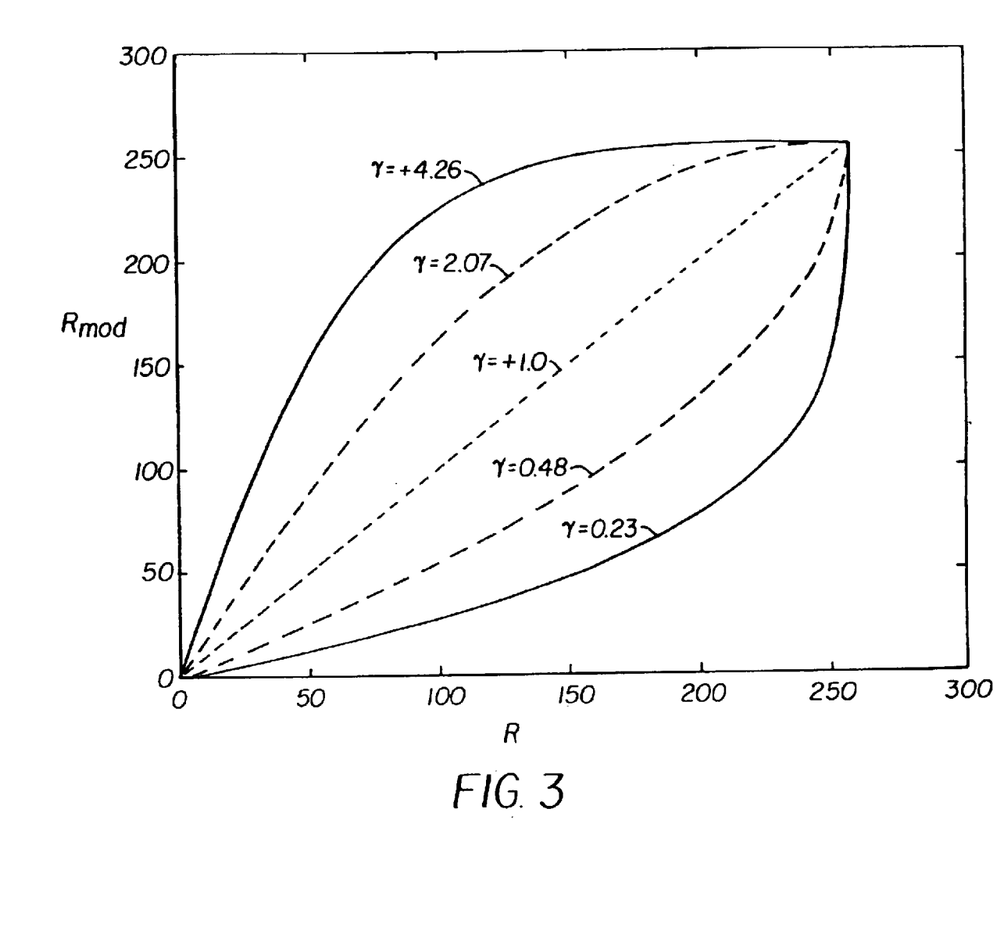
FIG. 3 is a plot of a gamma function providing several good functional fits between comparison data of the type plotted in FIG. 2 for the red color component of a limited gamut digital image.

FIG. 2 shows plots determined from the comparator 18 illustrating the effects of several different exposure adjustment amounts A on the sRGB code values of the limited color gamut digital image input to the comparator 18. Those of ordinary skill in the art will recognize that gray values may lie in a different range, e.g. 0–1.0, or 0–4095, but that such code values are equivalent to gray values in the range of 0–255 for the purposes of the present invention by virtue of the fact that simple scaling operations may be performed to scale other gray values into the 0–255 range. As will be explained, FIG. 3 shows a resulting good functional fit, as produced, e.g., by the Matlab program, between the code values of the limited color gamut digital image and the modified limited color gamut digital image for several exposure adjustments.

A good functional relationship between the sRGB code values of the limited color gamut digital image and the modified limited color gamut digital image is found as follows. First, the pixel values of the color components are each individually inverted. Next, the inverted color component values are raised to the power of gamma. Finally, the gamma-modified inverted color component values are themselves inverted. For an image having red, green, and blue color components, $$R_{mod} = 255\left[1 - \left\{1 - \frac{R}{255}\right\}^\gamma\right] \quad (1)$$

$$G_{mod} = 255\left[1 - \left\{1 - \frac{G}{255}\right\}^\gamma\right] \quad (2)$$

$$B_{mod} = 255\left[1 - \left\{1 - \frac{B}{255}\right\}^\gamma\right] \quad (3)$$

where:
R represents a red color component of a pixel of a limited color gamut digital image.
G represents a green color component of a pixel of a limited color gamut digital image.
B represents a blue color component of a pixel of a limited color gamut digital image.
$R_{mod}$ represents a red color component of a pixel of a modified limited color gamut digital image.
$G_{mod}$ represents a green color component of a pixel of a modified limited color gamut digital image.
$B_{mod}$ represents a blue color component of a pixel of a modified limited color gamut digital image.
γ is greater than 0. Values of γ greater than 1 result in a lighter modified limited color gamut digital image. Values of γ less than 1 result in a darker modified limited color gamut digital image. A value of γ=1 results in an identity operation.

FIG. 3 shows the resulting functional fit between code values of the limited red color gamut digital image and the modified limited red color gamut digital image for various values of γ, according to Equation (1). Similar functional fits, though not shown, would apply to the green and blue color gamut digital images, according to Equations (2) and (3). These functional relationships are good matches for the plots shown in FIG. 2. Thus, the functions of Equations (1)–(3) can be applied directly to a limited gamut digital image, e.g., an sRGB image, in order to effectively modify the exposure on the original scene.

Figure 4:
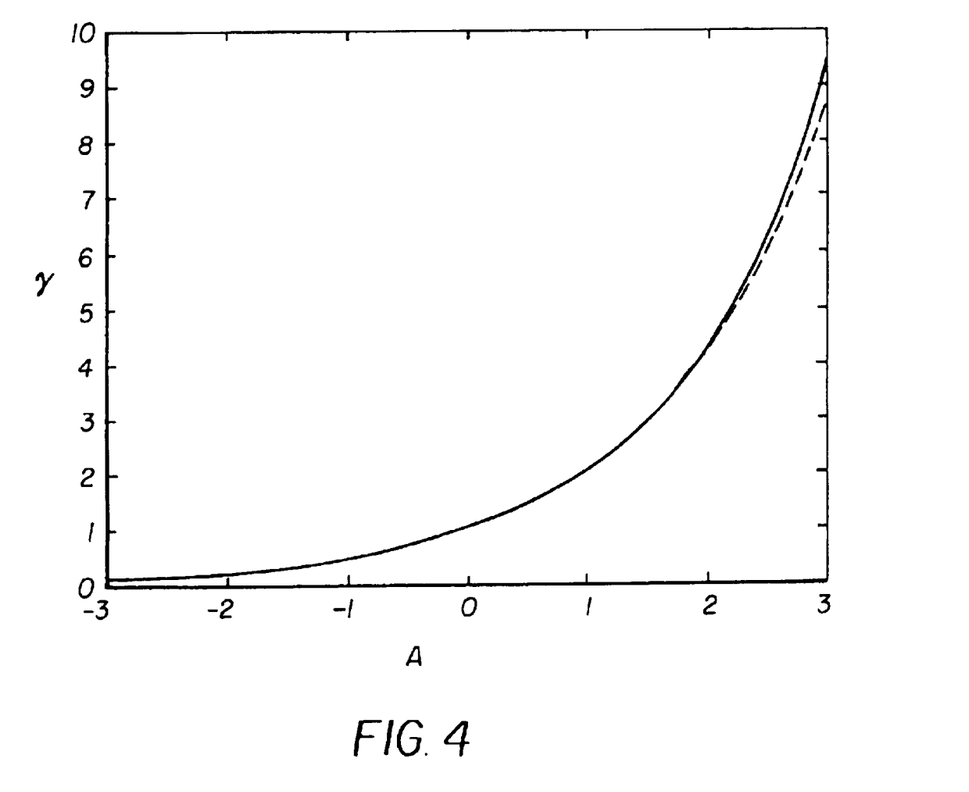
FIG. 4 is a plot of the relationship between the stops of exposure adjustment shown in FIG. 2 and the value of gamma that produces the closest functional matches shown in FIG. 3.

FIG. 4 shows a plot (solid line) of the relationship between the stops of exposure adjustment amount A and the value of γ that produces the closest functional match using Equations (1)–(3). This relationship can be approximated (dotted line) with the Equation:

$$\gamma = b^A \quad (4)$$

where b ranges between 1.75 and 2.25. Using a least squares fitting technique as is well known in the art, the optimal value of b is determined to be b=2.065.

Thus the value of γ for effectively increasing the scene exposure of an sRGB rendered limited color gamut digital image is greater than 1, and the value of γ for effectively reducing the scene exposure of an sRGB rendered limited color gamut digital image is less than 1. The value of γ is always greater than 0. Typically, exposure changes having an absolute value greater than 2 stops cannot be applied to a limited color gamut digital image without introducing objectionable artifacts. Corresponding to this range of A (−2 to 2), a typical range of γ is 0.235 to 4.26.

Figure 5:
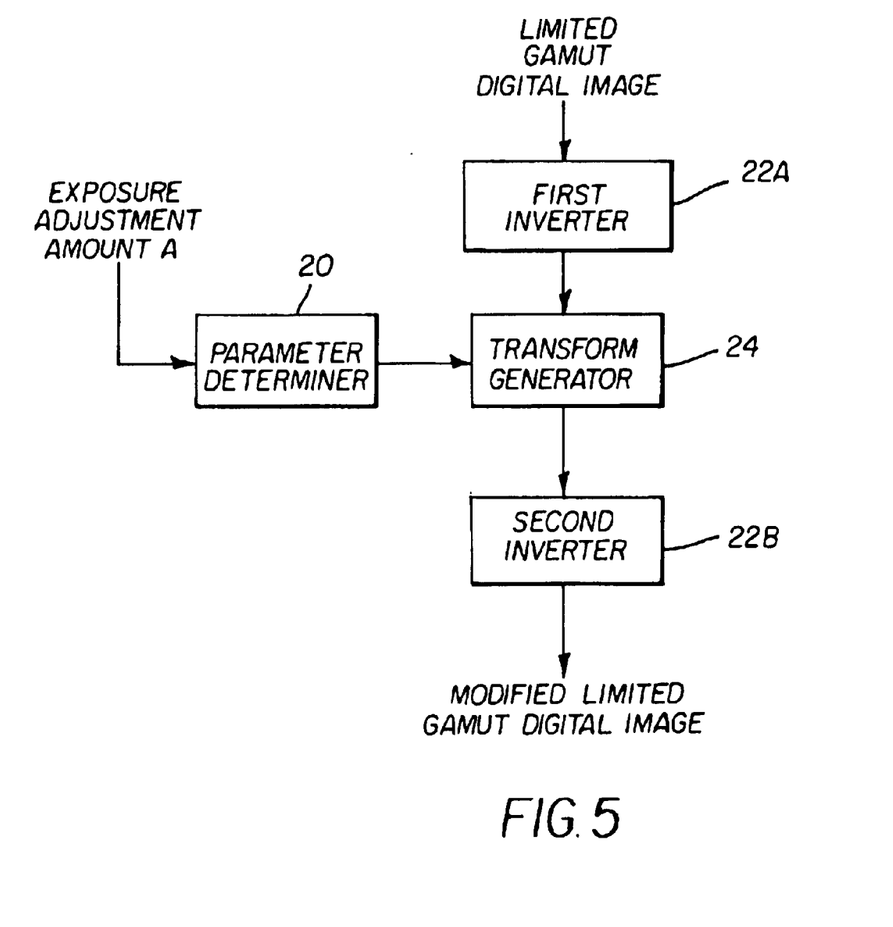
FIG. 5 is a flow diagram of a method according to the invention for applying an exposure adjustment to a limited gamut digital image.

FIG. 5 shows a flow diagram of the present invention for adjusting the balance of a limited gamut digital image. A parameter determiner inputs a parameter A indicating a desired exposure adjustment amount. Preferably, the parameter A is given in units of stops of desired scene exposure change, although other parameters in other units may be used with equal success. The value of A may be determined by manual means, such as by intervention from a human operator, possibly with a interactive graphical user interface (GUI), or with an automatic algorithm, for example as described in U.S. Pat. No. 4,945,406. Those skilled in the art of image processing can easily modify the present invention to operate with parameters given in other units. The parameter determiner 20 calculates the output value γ corresponding to the desired exposure change A, using Equation (4).

Next, the limited gamut digital image is input to the first inverter 22A for individually inverting the pixel values of each input pixel according to the equation (255-pixel value). Next, the inverted pixel values are passed to the transform generator 24 for the application of the gamma value. The gamma value is input by the transform generator 24 from the parameter determiner 20, where the value of gamma is determined based on a desired amount of exposure adjustment A. The transform generator 24 applies the gamma value γ to the inverted pixel values according to the equation (inverted pixel value)$^γ$. Finally, the inverted pixel values after gamma application are passed to a second inverter 22A according to the equation [1-(inverted pixel value)$^γ$], thereby providing limited gamut digital image pixel values adjusted for an improved exposure balance.

Those skilled in the art will recognize that the operations of the first inverter 22A, the transform generator 24, and the second inverter 22B can all be achieved with the application of a single LUT (look-up-table). The use of LUTs for image processing is well known in the art of image processing. A LUT is an efficient method by which image pixel transforms are applied to a digital image. In an actual system, the LUT may simply be loaded from a database, or created according to the following equations, the results of cascading equations (1) through (4), $$R_{mod} = 255\left[1 - \left\{1 - \frac{R}{255}\right\}^{b^A}\right] \quad (5)$$

$$G_{mod} = 255\left[1 - \left\{1 - \frac{G}{255}\right\}^{b^A}\right] \quad (6)$$

$$B_{mod} = 255\left[1 - \left\{1 - \frac{B}{255}\right\}^{b^A}\right] \quad (7)$$

Where b has been found experimentally to be optimal at b=2.065.

Those skilled in the art will recognize that the present invention is not intended to be limited to the RGB color space and the number range describing it, and that it is equally applicable to any other color space. The number range 0 to 255 is used for descriptive purposes and simple arithmetic can be applied such that the present invention may be used for images having other numerical ranges.

In addition, the present invention may be applied to all color components of a digital image, or a single color component, such as a luminance component, while the chrominance components are left un-modified. In that case, the modified luminance component $Y_{mod}$ is given as a function of the original luminance value Y:

$$Y_{mod} = 255\left[1 - \left\{1 - \frac{Y}{255}\right\}^{b^A}\right]$$

The present invention has been described with reference to a preferred embodiment. Changes may be made to the preferred embodiment without deviating from the scope of the present invention.

PARTS LIST 12 exposure adjuster
16 renderer
16A first renderer
16B second renderer
18 comparator
20 parameter determiner
22A first inverter
22B second inverter
24 transform generator

What is claimed is:

1. A method of adjusting the balance of a digital image, said method comprising the steps of:

(a) receiving a digital image including a plurality of pixel values;

(b) inverting the pixel values;

(c) applying a gamma value (γ) individually to each inverted pixel value to raise each inverted pixel value to the power of the gamma value, wherein the gamma value is related to an exposure adjustment amount (A) indicating a desired exposure adjustment of the original scene; and (d) inverting the inverted pixel values after application of the gamma value, thereby providing modified pixel values representative of a modified digital image that is adjusted for exposure.

2. The method as claimed in claim 1 wherein the digital image comprises a digital color image.

3. The method as claimed in claim 2 wherein the pixel values comprise red, green and blue component pixel values that are separately adjusted for exposure.

4. A computer storage medium having instructions stored therein for causing a computer to perform the method of claim 1.

5. A method of adjusting the exposure balance of a limited gamut digital image, said method comprising the steps of:

(a) receiving a limited gamut digital image including a plurality of pixel values;

(b) inverting the pixel values;

(c) applying a gamma value (γ) individually to each inverted pixel value to raise each inverted pixel value to the power of the gamma value, wherein the gamma value is related to an exposure adjustment amount (A) indicating a desired exposure adjustment of the original scene; and (d) inverting the inverted pixel values after application of the gamma value, thereby providing modified pixel values representative of a modified limited gamut digital image that is adjusted for exposure.

6. The method as claimed in claim 5 wherein the limited gamut digital image is a rendered image.

7. The method as claimed in claim 6 wherein the limited gamut digital image is an sRGB image.

8. The method as claimed in claim 5 wherein the limited gamut digital image comprises a digital color image.

9. The method as claimed in claim 8 wherein the limited gamut digital image comprises red, green and blue component pixel values.

10. A computer storage medium having instructions stored therein for causing a computer to perform the method of claim 5.

11. A method of adjusting the exposure balance of a limited gamut digital image, said method comprising the steps of:

(a) receiving a limited gamut digital image including a plurality of pixel values;

(b) inverting the pixel values;

(c) applying a gamma value (γ) individually to each inverted pixel value to raise each inverted pixel value to the power of the gamma value, wherein the gamma value is related to an exposure adjustment A by $\gamma=b^A$, where b ranges between 1.75 and 2.25; and (d) inverting the inverted pixel values after application of the gamma value, thereby providing modified pixel values representative of a modified limited gamut digital image that is adjusted for exposure.

12. The method as claimed in claim 11 wherein the optimal value of b is determined to be b=2.065.

13. The method as claimed in claim 11 wherein the limited gamut digital image is a rendered image.

14. The method as claimed in claim 13 wherein the limited gamut digital image is an sRGB image.

15. The method as claimed in claim 11 wherein the limited gamut digital image comprises a digital color image.

16. The method as claimed in claim 11 wherein the limited gamut digital image comprises red, green and blue component pixel values.

17. A computer storage medium having instructions stored therein for causing a computer to perform the method of claim 11.

18. A method of adjusting the balance of a limited gamut digital image, said method comprising the steps of:

(a) receiving an extended color gamut digital image including a plurality of pixel values;

(b) generating pixel values of a modified extended color gamut digital image by applying an exposure adjustment to the pixel values of the extended color gamut digital image;

(c) producing pixel values of a limited gamut digital image by rendering the pixel values of the extended color gamut digital image;

(d) producing pixel values of a modified limited gamut digital image by rendering the pixel values of the modified extended color gamut digital image; and (e) determining a functional relationship between the pixel values of the modified limited gamut digital image and the limited gamut digital image, whereby an adjustment is derived from the functional relationship for adjusting the balance of the limited gamut digital image.

19. The method as claimed in claim 18, further comprising the steps of:

(f) receiving pixel values of a different limited gamut digital signal; and (g) using the adjustment derived from the functional relationship to modify the pixel values of the different limited gamut digital image in order to produce a modified limited gamut digital image that is adjusted for balance.

* * * * *